United States Patent [19]

Schneider

[11] Patent Number: 5,234,592
[45] Date of Patent: Aug. 10, 1993

[54] PISTON PAINT PUMP FILTER

[75] Inventor: Gerhard Schneider, Friedrichshafen, Fed. Rep. of Germany

[73] Assignee: Wagner Spray Tech Corporation, Minneapolis, Minn.

[21] Appl. No.: 733,223

[22] Filed: Jul. 22, 1991

[51] Int. Cl.⁵ .............................. B01D 39/12
[52] U.S. Cl. ................... 210/440; 210/443; 210/499
[58] Field of Search ........... 210/440, 443, 499, 497.01

[56] References Cited

U.S. PATENT DOCUMENTS

| 1,095,198 | 5/1914 | Finch | 210/453 |
|---|---|---|---|
| 3,241,681 | 3/1966 | Pall | 210/499 |
| 3,502,116 | 3/1970 | Crawford | 210/499 |
| 3,502,221 | 3/1970 | Butterfield | 210/444 |
| 3,701,433 | 10/1972 | Krakauer et al. | 210/499 |
| 3,750,889 | 8/1973 | Acosta | 210/499 |
| 3,859,216 | 1/1975 | Sisson et al. | 210/443 |
| 4,243,535 | 1/1981 | Behrends et al. | 210/499 |
| 5,045,189 | 9/1991 | Van der Vos et al. | 210/440 |
| 5,053,129 | 10/1991 | Kitson | 210/499 |

Primary Examiner—Robert A. Dawson
Assistant Examiner—W. L. Millard
Attorney, Agent, or Firm—Faegre & Benson

[57] ABSTRACT

An improved filter for pressurized painting equipment formed of a cylindrical filter element and carried in a cylindrical housing and base having an inlet and an outlet. The filter element has solid end caps and is made up of one or two layers of wire mesh and is supported by a helical spring interior of the wire mesh.

13 Claims, 3 Drawing Sheets

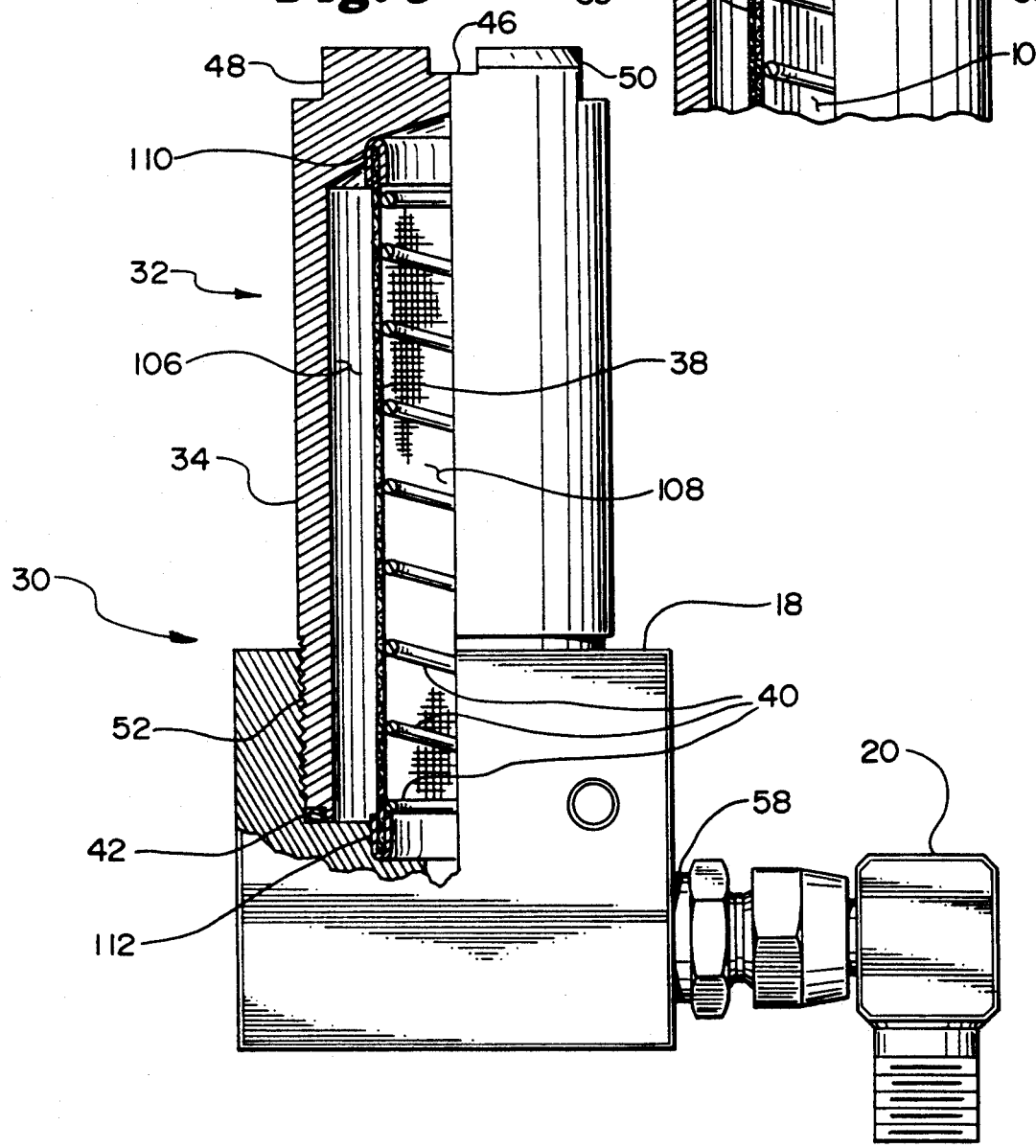

PISTON PAINT PUMP FILTER

FIELD OF THE INVENTION

This invention relates to the field of pressurized painting equipment, more particularly to an improved cylindrical filter design useful in paint spraying equipment operating at relatively high pressures and high flow rates.

BACKGROUND OF THE INVENTION

In the past, there has been a need to provide for filtering particulates from a paint supply line in pressurized painting equipment. Prior art filters have suffered from various deficiencies including having relatively coarse cylindrical filter elements, permitting relatively large particles to pass through the element. Also some prior art filters were designed such that the inlet side of the cylindrical element was interior of the element, thus trapping particles within the cylindrical element, making it more difficult to clean.

The present invention overcomes deficiencies of the prior art by providing an improved cylindrical filter which has the inlet side exterior of a cylindrical element resulting in ease of cleaning and further has a relatively fine mesh or sieve element to provide for better filtration. Support means are also provided to prevent buckling of the improved cylindrical element.

BRIEF DESCRIPTION OF THE DRAWINGS

FIG. 3 shows a partially cut away side elevation view of the improved filter apparatus of the present invention.

FIG. 4 shows a fragmentary partially cut away side elevation view of an alternative embodiment of the filter element of the improved filter apparatus.

DETAILED DESCRIPTION

Figure 1:
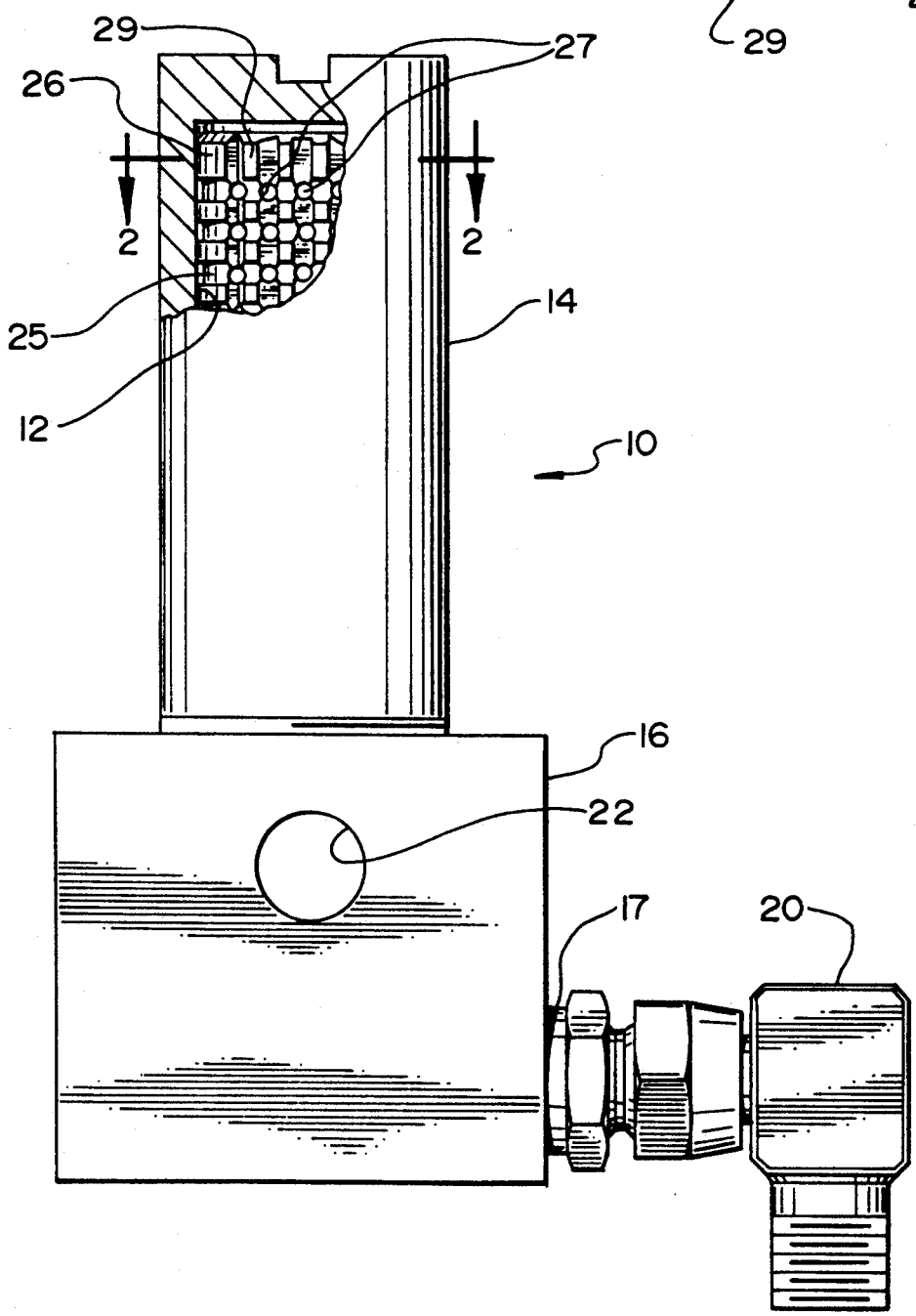
FIG. 1 shows partially cut away side elevation view of a prior art filter apparatus.
Figure 2:
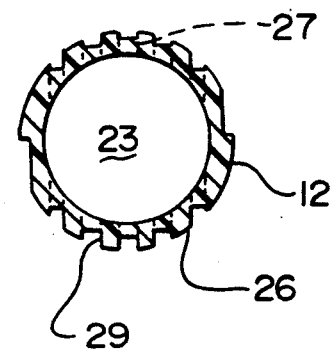
FIG. 2 is a section view of a prior art filter element.

Referring now to FIGS. 1 and 2, a prior art filter apparatus 10 may be seen. In such a prior art filter apparatus 10, a cylindrical filter element 12 is utilized to block particles entering at inlet 20 from progressing through the remainder of the painting equipment, typically a paint spray gun (not shown) connected to the filter base outlet 22 via a flexible hose (also not shown).

Element 12 is preferably retained in a cylindrical housing 14. Housing 14 is threadedly received in a base 16. Base 16 has an inlet port 17 receiving a right angle fitting 20 and in communication with the interior 23 of element 12. One or more outlet ports 22 in base 16 are in communication with the exterior 26 of element 12.

Element 12 has exterior annular recesses 25, through holes 27, and axial grooves 29 through and along which paint can flow to traverse element 12.

Referring now to FIGS. 3 and 4, the improved filter of the present invention includes a base 18 as part of an apparatus 30 which includes a cylindrical filter assembly 32 carried in a filter housing 34.

Filter assembly 32 preferably includes a cylindrical filter element 38 supported by a helical spring 40. Housing 34 is preferably secured to base 18 by interengaging threads 52 and sealed to base 18 by an O-ring 42 or other conventional seal.

It is to be understood that various mesh filter elements may be used in the practice of the present invention to remove particulates from the paint supply line which particulates could otherwise plug metering orifices in a spray gun (not shown) connected to the apparatus 30. In FIG. 3 a single layer element 38 is shown, which preferably is a 20 mesh or sieve size. In FIG. 4, element 38 is preferably a 24 mesh element provided to support a finer mesh element layer 39. Layer 39 may be a 50, 100, 200 or other mesh or sieve size to filter finer particulates, as desired.

Figure 5:
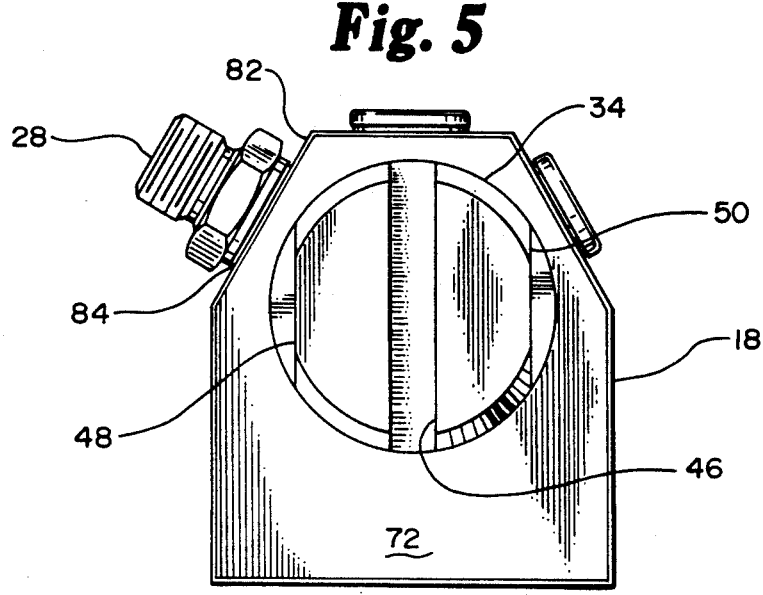
FIG. 5 shows a top view of the improved filter apparatus.
Figure 6:
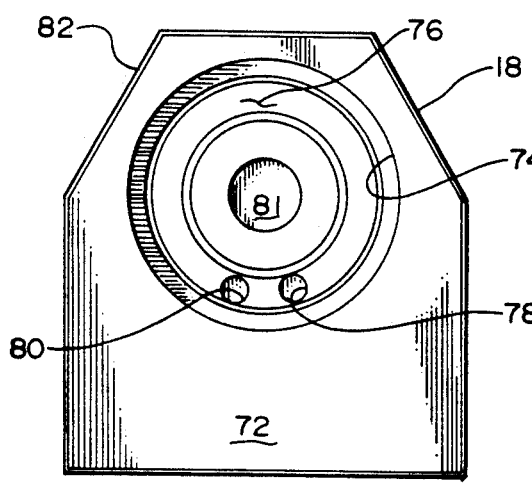
FIG. 6 shows a top view of a filter base of the improved filter apparatus.
Figure 7:
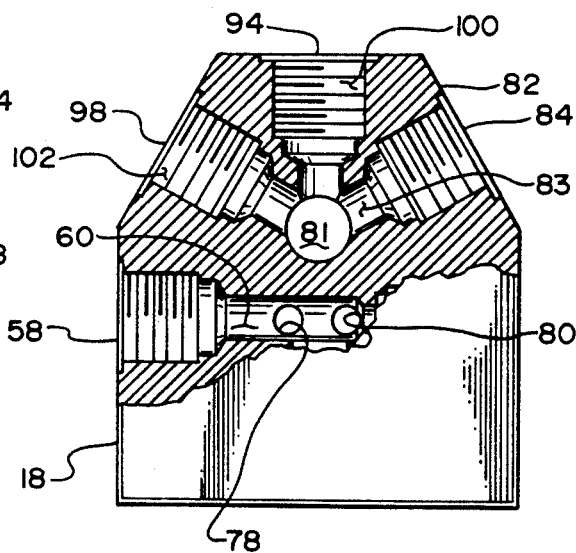
FIG. 7 shows a partial section view looking up showing internal inlet and outlet passageways of the base of the improved filter apparatus.

Referring now also to FIGS. 5-7, features of base 18 relating to apparatus 30 may be seen in more detail. Referring first most particularly to FIGS. 5 and 6, a top view of base 18 may be seen with and without housing 34 and element 38 present. Referring now also to FIG. 7, base 18 preferably has an inlet port or aperture 58 therein. A first bore 60 extends from inlet port 58 in a first surface 56 into base 18 to a pair of bores 78, 80 transverse to bore 60.

Base 18 also preferably has a top face 72 having a filter aperture or filter mounting port 74 therein. A filter mounting bore 76 extends from aperture 74 in top face 72 into base 18 transverse to the first bore 60.

Base 18 also preferably has a face 82 having a paint outlet port or aperture 84 therein. In FIG. 5 an outlet fitting 28 is shown received in outlet port 84. Base 18 may also preferably have further outlet ports 94 and 98. Each of outlet ports 94, 98 respectively have bores 100, 102 communicating with an extension 81 of filter mounting bore 76.

Referring now to FIGS. 3, 6 and 7, a fluid such as paint enters apparatus 30 through fitting 20 via inlet port 58, flows through bore 60, and then passes through channels 78, 80 where it enters a cylindrical annular region 106 exterior and upstream of filter element 38. Paint passes through filter element 38 radially inwardly from the upstream side of filter 38 to the downstream side of filter 38 formed by cylindrical region 108. The downstream side of filter 38 is in communication with extension 81 allowing paint to be delivered to the paint outlet port 84 and then through fitting 28 via bore 83.

Referring again to FIGS. 3 and 4, filter assembly 32 preferably includes a pair of end caps 110, 112 of stainless steel material. Each end cap 110, 112 is formed or crimped on element 38 (and layer 39 if used) to provide a rigid, well-defined right circular cylinder end profile at each end of element 38. The wire screens or meshes 38, 39 are also preferably made of stainless steel. The filter housing 34 and base 18 are preferably nickel-plated steel.

Filter element 38 is able to be inspected, cleaned and replaced if necessary by removal of filter housing 34 from base 18. Slot 46 and flats 48, 50 are provided in housing 34 to enable housing 34 to be rotated via application of a suitable tool such as a bar or wrench (not shown) to disengage threads 52 holding housing 34 to base 18. Such removal of housing 18 makes element 38 immediately accessible and removable from apparatus 30.

The invention is not to be taken as limited to all of the details thereof as modifications and variations thereof may be made without departing from the spirit or scope of the invention.

What is claimed is:

1. A improved filter apparatus for pressurized painting systems comprising:
    a) a base having an inlet, an outlet and a threaded filter mounting bore therein;
    b) a cylindrical filter housing threadably received in the base; and
    c) a filter element formed of a single radial layer of woven wire mesh screen in the shape of a right circular cylinder free of corrugations and defining an exterior surface and an interior surface
    wherein the base inlet is in communication with the exterior surface of the filter element and the base outlet is in communication with the interior surface of the filter element such that particulates carried by a fluid from the inlet towards the outlet will be retained on the exterior surface of the filter element.

2. The apparatus of claim 1 wherein the cylindrical filter further comprises a corrugation-free support means interior of and in substantially continuous contact with the cylindrical mesh element for preventing radially inward collapse of said cylindrical mesh element while operating at relatively high pressure.

3. The apparatus of claim 1 wherein the cylindrical mesh element is a 20 mesh sieve.

4. The apparatus of claim 2 wherein the mesh size of the cylindrical mesh element is in the range of 20 to 200 mesh.

5. The apparatus of claim 1 wherein the cylindrical mesh element compromises a single layer.

6. The apparatus of claim 1 wherein the cylindrical mesh element comprises two separate, adjacent and concentric layers of woven wire mesh screens in substantially continuous contact with each other and wherein the two layers comprise an outer layer and an inner layer, with the outer layer having a mesh size of finer openings than the inner layer such that the inner layer provides support for the outer layer.

7. The apparatus of claim 6 wherein the inner layer comprises a 24 mesh layer and the outer layer comprises a mesh size in the range of 50 to 200 mesh.

8. The apparatus of claim 1 wherein the unitary base further comprises a plurality of outlet ports each located downstream of the filter element.

9. The apparatus of claim 1 further comprising a seal between filter housing and the base.

10. The apparatus of claim 9 wherein the seal comprises an O-ring.

11. The apparatus of claim 1 wherein the filter element further comprises an end cap at each end of the right circular cylinder woven wire mesh.

12. The apparatus of claim 11 wherein the end caps are formed of stainless steel.

13. The apparatus of claim 1 wherein the filter element is formed of stainless steel mesh.

* * * * *